(12) United States Patent
Fisher

(10) Patent No.: US 6,488,420 B1
(45) Date of Patent: Dec. 3, 2002

(54) CAMERA STAND AND ACTUATING MECHANISM

(76) Inventor: Brian J. Fisher, 1602 Cedar St., Eudora, KS (US) 66025

( * ) Notice: Subject to any disclaimer, the term of this patent is extended or adjusted under 35 U.S.C. 154(b) by 98 days.

(21) Appl. No.: 09/598,083

(22) Filed: Jun. 21, 2000

(51) Int. Cl.⁷ .............................................. G03B 17/00
(52) U.S. Cl. ...................................... 396/419; 396/428
(58) Field of Search ................................ 396/6, 25, 27, 396/29, 419, 420, 422, 424, 425, 428; 248/295.11

(56) References Cited

U.S. PATENT DOCUMENTS

| | | | |
|---|---|---|---|
| 2,588,705 A | 3/1952 | Cuchet | 396/136 |
| 2,949,838 A | 8/1960 | Skalabrin | 396/425 |
| 3,737,130 A * | 6/1973 | Shiraishi | 248/181.1 |
| 3,893,144 A | 7/1975 | Funderburk | 396/425 |
| 4,437,753 A | 3/1984 | Dunn | 396/420 |
| 4,526,308 A * | 7/1985 | Dovey | 224/265 |
| 5,281,988 A * | 1/1994 | Martin | 396/59 |
| D345,573 S | 3/1994 | Reppert | D16/243 |
| 5,424,791 A | 6/1995 | Campbell | 396/420 |
| 5,823,491 A * | 10/1998 | Lindsay et al. | 248/169 |
| 6,076,978 A * | 6/2000 | McIlvenna | 396/425 |
| 6,138,826 A * | 10/2000 | Kanamori et al. | 206/316.2 |

* cited by examiner

Primary Examiner—David M. Gray
Assistant Examiner—Rochelle Blackman
(74) Attorney, Agent, or Firm—Shook, Hardy & Bacon L.L.P.

(57) ABSTRACT

A camera stand and camera housing for allowing users to photograph themselves with a single use camera. The stand may include a tripod having legs that are adjustable in and out to spread the legs and collapse them together. A camera pedestal at the top of the tripod has a ball that fits in a socket on the bottom of the camera housing to provide for universal aiming of the camera. The camera housing has a rear opening for loading and unloading of cameras and a hinged door for closing the rear opening. Alignment surfaces inside the housing assure that all commercially available single use cameras are positioned with their shutter buttons located directly below a striker which actuates the shutter button. A control mechanism forces the striker downwardly against the shutter button after elapse of a time delay giving the user enough time to move in front of the camera.

19 Claims, 4 Drawing Sheets

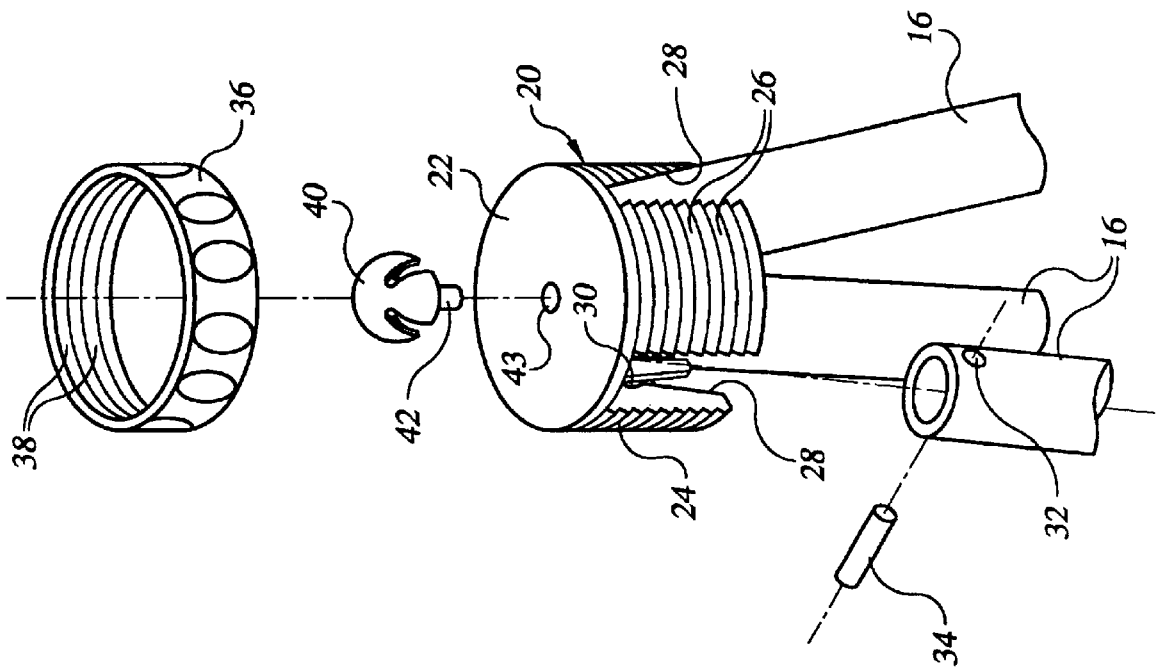
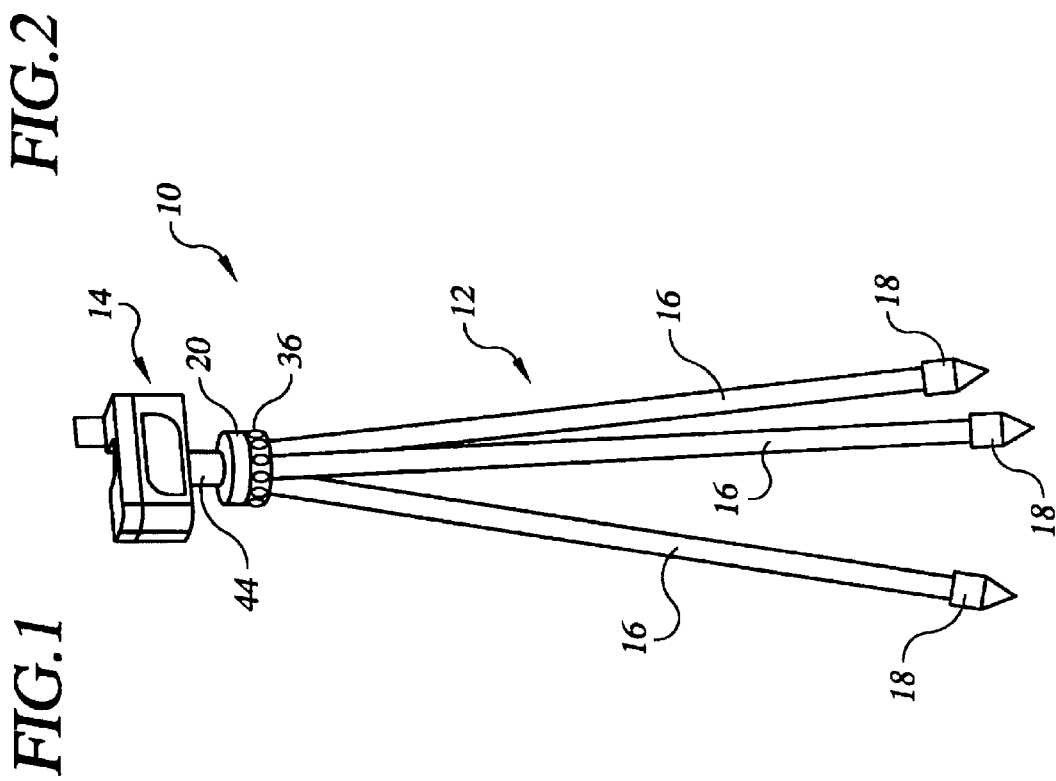

CAMERA STAND AND ACTUATING MECHANISM

FIELD OF THE INVENTION

This invention relates generally to photography and deals more particularly with a device that enables users to photograph themselves with a single use camera.

BACKGROUND OF THE INVENTION

Single use cameras have achieved considerable popularity in recent years, primarily because they are inexpensive and often more convenient than other types of cameras. A single use camera takes photographs on a single roll of film and is then discarded. This makes single use cameras especially well suited for use in outdoor settings where there may be a reluctance to use more expensive cameras due to the possibility of damage to them. Thus, single use cameras are particularly popular with fishermen, hunters, campers, hikers and others engaged in outdoor activities. They are also popular among people who take photographs so infrequently that the cost of a more expensive camera is not justified.

Fishermen in particular often want to have their pictures taken with their catch. If a fisherman is alone, that is not feasible with the equipment that is currently available and practical for use on a fishing boat. There are numerous other situations, both in the outdoors and in other settings, where a need arises for persons to take pictures of themselves and there is no one else around to operate the camera.

SUMMARY OF THE INVENTION

Accordingly, it is apparent that a need exists for a device that allows persons to photograph themselves and particularly to do so inexpensively with a single use camera.

The present invention is directed to a specially constructed apparatus that allows a single use camera to be operated in a manner that users can take their own photographs. In accordance with the invention, a tripod stand is equipped at its top end with a pedestal on which a special camera housing may be mounted to hold a single use camera. The tripod can be set up, the housing can be applied to the pedestal, and the camera can be inserted into the camera housing and adjusted to face the area that is to be photographed. The user can then activate a timer button which provides a time delay adequate to allow the user to assume a position in the area where the camera is aimed. A control mechanism activates the shutter button of the camera after the time delay has elapsed, so the user appears in the photograph along with fish, game or other items within the camera field of view.

It is a particular feature of the invention that the control mechanism is constructed to assure effective and reliable operation even after repeated usage. A striker which is located above the shutter button is controlled by a spring loaded lever. A pivotal pawl acts as a stop which normally holds the lever and striker away from the shutter button. When the user depresses a timer button, conventional circuitry initiates a time delay, after which a solenoid is energized to pivot the pawl away from the lever. A spring then operates the lever and forces the striker against the shutter button to actuate the camera. A plunger can be operated manually to reset the lever and striker prior to the next photograph.

Another important feature of the invention is the special construction of the camera housing. The housing is constructed so that it can accommodate all commercially available single use cameras while assuring that their shutter buttons are aligned below the structure for reliable actuation. The camera housing has a front opening through which the camera lens views. A back opening in the camera housing allows the camera to be loaded and positioned against alignment surfaces at one side and the front. When the camera is in place within the housing, a hinged door may be closed to cover the back loading opening. The camera may be secured against the alignment surfaces by spacer blocks or pads to assure that the camera remains in a position where the striker is located directly above the shutter button. If necessary, a bottom pad may be placed beneath the camera to assure that the shutter button is located high enough to be operated by the striker.

The construction of the tripod is another important feature of the invention. Each leg is pivoted at its top end to the camera pedestal. The pedestal has a ball that may be received in a socket on the bottom of the camera housing to allow universal directional adjustment of the camera. This allows the camera to be aimed at the area desired and oriented as desired. The tripod is useful in applications other than to support a camera, including various applications that require the support of instruments and equipment such as video cameras, lights and other things.

The side wall of the pedestal is threaded and includes slots through which the tripod legs extend. A threaded adjustment ring on the pedestal can be threaded upwardly to allow the legs to spread apart or downwardly to force the legs more closely together. In this fashion, the height of the camera can be adjusted. Also, the legs can be collapsed closely together for convenient storage and transport.

Additional features of the invention include alternative mounting stands which may be used in place of the tripod. One alternative stand construction allows the camera to be mounted on a fishing boat where a front swivel seat is normally located. Another mounting arrangement includes a clamp that allows the camera stand to be mounted to virtually any desired object.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a photography device constructed according to a preferred embodiment of the present invention, with the camera housing mounted on the tripod of the device;

FIG. 2 is an enlarged fragmentary exploded view in perspective of the upper portion of the tripod shown in FIG. 1;

DETAILED DESCRIPTION OF THE INVENTION

Figure 3:
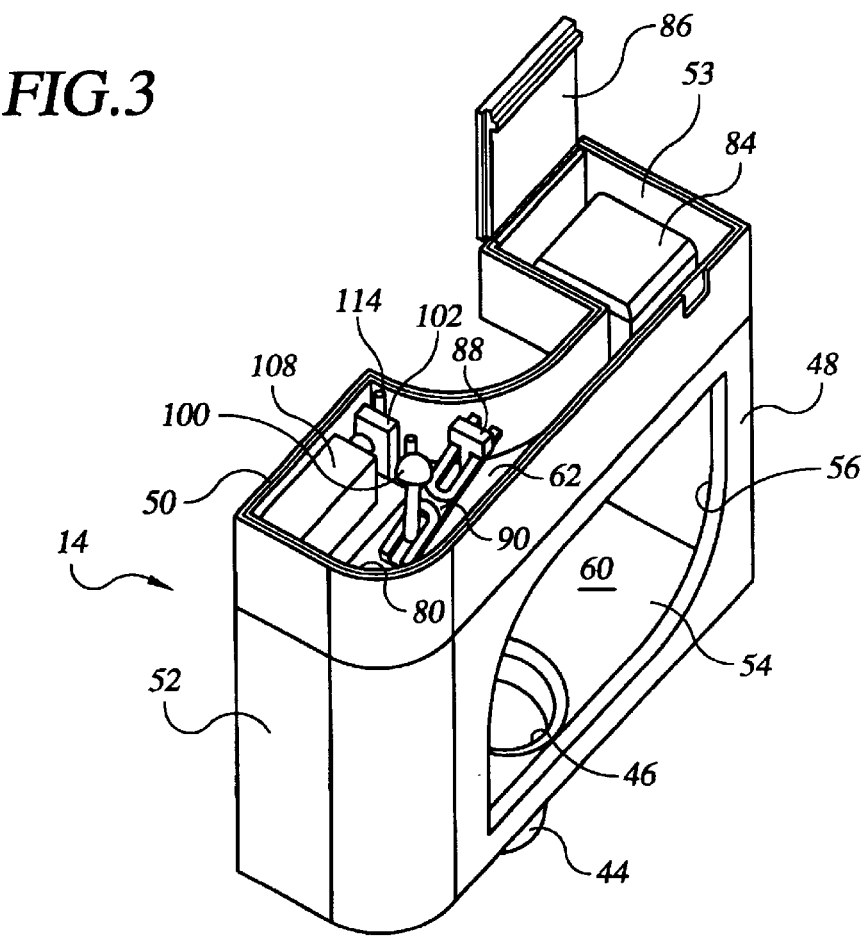
FIG. 3 is an enlarged top perspective view of the camera housing of the device shown in FIG. 1, with the cover panel removed to show internal components.

Referring now to the drawings in more detail and initially to FIG. 1 in particular, numeral 10 generally designates a photography device constructed in accordance with a preferred embodiment of the present invention. The device 10 includes as its principal components a tripod stand 12 and a camera housing 14 mounted on the stand. The stand 12 may include three legs 16 arranged in a tripod configuration and having padded feet 18 on their lower ends. The tripod legs 16 connect at their upper ends with a camera pedestal 20.

FIG. 2 best shows the connections between the tripod legs 16 and the pedestal 20. The pedestal 20 includes a flat disk which provides a mounting platform 22 for the camera. Extending downwardly from the outer edge of the platform 22 is a cylindrical side wall 24 that is externally threaded at 26. The side wall 24 has three equidistantly spaced vertical cutouts or slots 28 extending through it. Each slot 28 is wide enough to closely accommodate extension of one of the legs 16 through it.

The inside portion of the side wall 30 includes three horizontal passages 30 (only one of which is visible in FIG. 2). The passages 30 are adjacent to the upper end portions of the respective slots 28. The upper end portion of each tripod leg 16 is provided with a horizontal opening 32 through which a pin 34 extends. The pins 34 are inserted into the respective passages 30 in order to connect the tripod legs 16 with pedestal 20 in a manner allowing each leg to pivot about the horizontal axis provided by the corresponding pin 34. The pivot axis provided by each pin has an orientation that is tangential relative to the pedestal disk 22, and the pins 34 are spaced equidistantly around the pedestal. Accordingly, the upper ends of the legs 16 are located at 120° increments relative to one another around the pedestal.

The inclinations of the legs 16 are controlled by an adjustment ring 36 which is internally threaded at 38 and threaded onto the pedestal side wall 24 with its threads 38 mating with the pedestal threads 26. The adjustment ring 36 can be threaded upwardly and downwardly on the pedestal 20 and engages at its lower edge the tripod legs 16. As ring 36 is threaded upwardly on the pedestal side wall 24, the legs 16 are able to move outwardly in slots 28 in order to spread the legs apart and decrease their angles of inclination. Conversely, when ring 36 is threaded downwardly on the pedestal, the legs 16 are forced more closely together such that their angles of inclination increase. In this manner, the position of the adjustment ring 36 allows adjustment of the elevation of the camera housing 14 which is mounted on the pedestal 20. Additionally or alternatively, the legs 16 may be constructed to telescope or otherwise allow their lengths to be adjusted as desired. When the ring 36 is adjusted downwardly to its maximum extent, the legs 16 are collapsed to where they are close together and nearly parallel to one another in a compact configuration for convenient storage and transport of the device 10.

While the tripod stand 12 is particularly useful for mounting the camera housing 14, it is also useful in other applications. For example, the tripod stand can be used to support a video camera, lights, surveying instruments and a wide variety of other things that require a stable support structure.

With continued reference to FIG. 2 in particular, a ball element 40 may be mounted on the disk 22 of platform 20. The ball element 40 has a slotted outer surface that is partially spherical. A mounting pin 42 projects downwardly from the ball 40 and may be snapped into or otherwise closely received in an opening 43 formed in the center of disk 22. As shown particularly in FIG. 3, the camera housing 14 has a downwardly projecting collar 44 on its bottom surface. The collar 44 presents a cylindrical socket 46 on the inside of the collar that fits closely around the ball element 40. This ball and socket connection of the camera housing 14 with the pedestal 20 allows the camera housing to be adjusted rotationally about a vertical axis and also allows the camera housing to be aimed upwardly and downwardly at an angle as well as titled to either side on the ball element. This universal mounting of the camera housing allows the camera that the housing contains to be aimed in the desired direction and at the desired orientation and angle toward the object which is to be photographed.

The construction and configuration of the camera housing 14 are best shown in FIGS. 3–6. The housing 14 has a box-like configuration which includes a front wall 48, a partial back wall 50, opposite side walls 52 and 53, and a bottom panel 54. The collar 44 projects downwardly from the bottom panel 54. The front wall 48 is provided with an opening 56 for viewing of the camera 58 (see FIG. 5). The camera lens 58a views through the front opening 56. The opening 56 is too small to permit passage of the camera 58 through it (see FIGS. 5 and 6).

Figure 6:
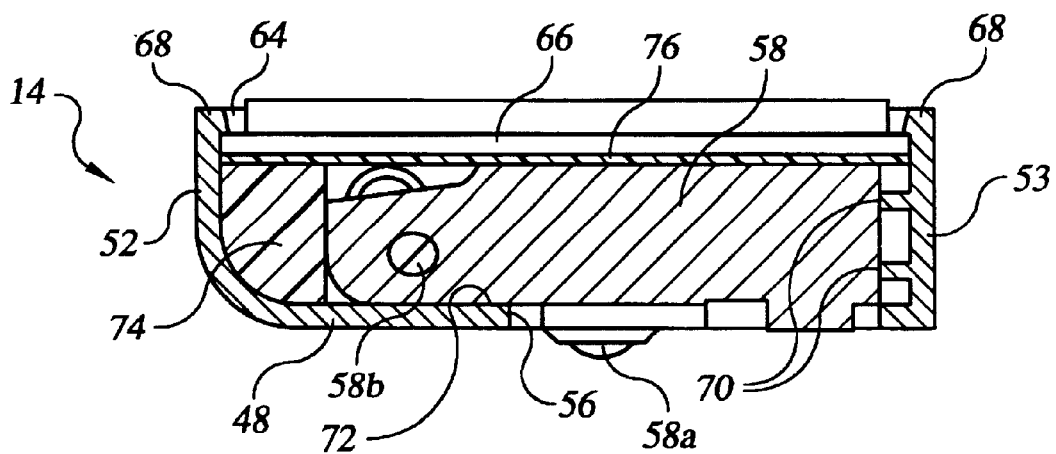
FIG. 6 is a sectional view taken generally along line 6—6 of FIG. 5 in the direction of the arrows.

The camera housing 14 presents an open interior 60 in which the camera 58 is received. The interior 60 is located behind the front wall 48, between the side walls 52 and 53, above the bottom panel 54 and below a mounting panel 62 which extends between the side walls 52 and 53 near the upper end of the camera housing. As best shown in FIG. 6, the camera housing 14 has a rear opening 64 through which the camera 58 can be loaded into and unloaded from the housing interior 60. A door 66 which is hinged at its bottom edge to the lower portion of the housing back can be opened to expose the rear opening 64 during loading and unloading of the camera. The door 66 may be swung upwardly to the closed position shown in FIG. 6 in order to enclose the camera 58 within the housing. The door 66 is held in the closed position shown in FIG. 6 by a pair of lips 68 formed on the rear edges of the side walls 52 and 53. The door can be opened by forcing it to swing downwardly and rearwardly so that it clears the lips 68.

When the camera 58 is inserted into the camera housing, the right side of the camera is positioned against side alignment surfaces 70 (FIG. 6) which are located on the right side wall 53 and project inwardly therefrom. The front face of the camera 58 is abutted against a front alignment surface 72 which is formed on the inside of the front wall 48. By abutting the camera against the alignment surfaces 70 and 72, a shutter button 58b (FIG. 6) which serves as an actuator button for the camera is located a known distance from the alignment surfaces, thus assuring that the shutter button is located properly for actuation in a manner that will be explained more fully.

There are currently three different single use cameras that are commercially available on a significant scale. Each of these has a different construction and a different size, but all are constructed such that their shutter buttons 58b are located very close to the same position when they are inserted into the housing 14 and abutted against the alignment surfaces 70 and 72. A foam block or pad 74 (FIG. 6) may be closely inserted between the left side of the camera 58 and the left side wall 52 in order to hold the camera against the side alignment surfaces 70. The pads 74 will have a somewhat different size for each of the different commercial camera models that may be used with the device 10. If necessary, a back pad 76 may be fitted between the back of the camera and the door 66 in order to maintain the front of the camera against the front alignment surface 72. Again, the thickness of the pad 76 may be varied to accommodate the particular camera. If necessary to locate the shutter button 58b high enough to be effectively actuated, a bottom pad 78 (see FIG. 5) may be inserted between the bottom panel 54 and the bottom of the camera.

The mounting panel 62 provides a platform on which the actuating and control components for operating the camera 58 may be mounted. A compartment 80 in which the actuating and control components are contained is formed above the panel 62 and is normally covered at the top by a top panel 82 (see FIG. 5). One side of the control compartment 80 houses a battery 84 (FIG. 3) which is normally covered by a hinged door 86. The components which actuate the shutter button 58b are mounted in compartment 80 on the side opposite the location of battery 84.

Figure 4:
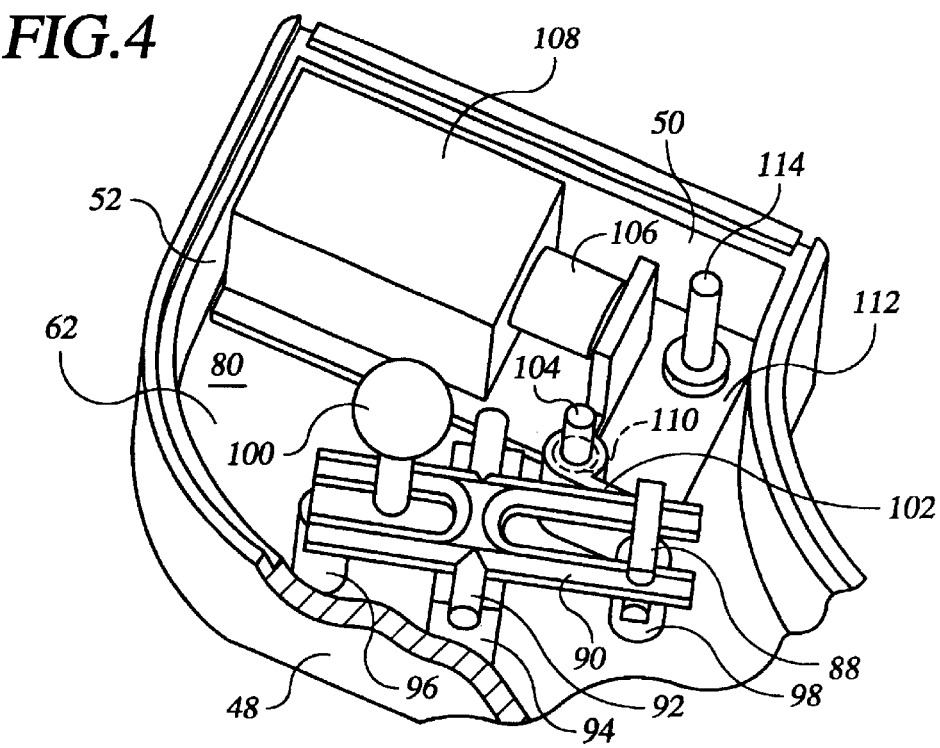
FIG. 4 is a fragmentary top perspective view on an enlarged scale of the camera actuating mechanism in the housing of the device.

With particular reference to FIGS. 3 and 4, a striker 88 which engages the shutter button 58b in order to actuate it is carried on one end of a lever 90. The lever 90 has a forked shape on which the striker 88 is carried. The striker has horizontal arms above and below the forks of lever 90 to assure that the striker moves up and down with the forked end of the lever. The center portion of the lever 90 is provided with a horizontal pin 92 which is pivotally mounted on a block 94 to provide a horizontal pivot axis upon which the lever 90 can pivot. A compression spring 96 is fitted between the panel 62 and the end of lever 90 opposite the end which carries the striker. The spring 96 continuously urges lever 90 in a direction to pivot the striker 88 downwardly to the actuating position of the striker. The striker 88 may project through an opening 98 in panel 62 in order to contact the shutter button 58b.

Figure 5:
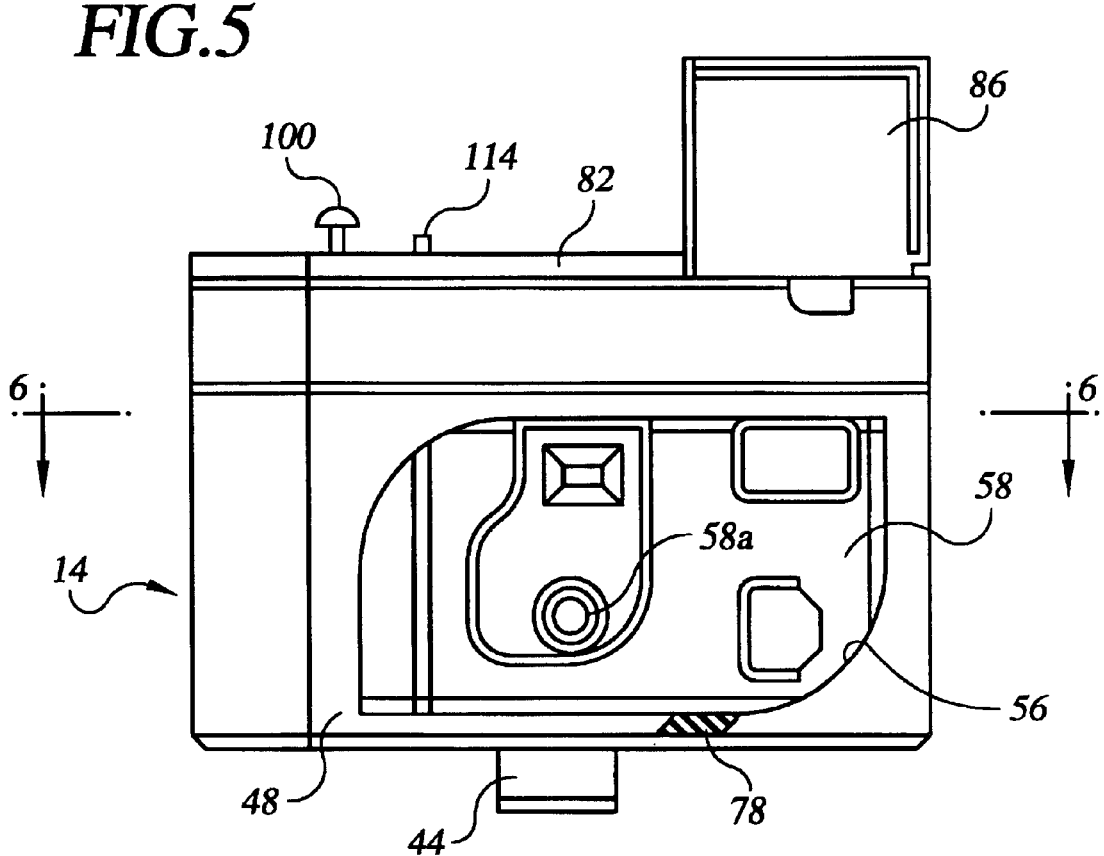
FIG. 5 is a front elevational view of the camera housing showing a single use camera installed therein.

A plunger 100 projects upwardly from lever 90 near the end opposite the striker 88. As shown in FIG. 5, the plunger 100 extends above the top panel 82 and is accessible so that an enlarged button on its top end can be depressed to reset lever 90 and striker 88. Depression of plunger 100 overcomes the force of the compression spring 96 and pivots lever 90 in a direction to raise the striker 88 away from the shutter button 58b. When the plunger 100 is depressed in this fashion, the lever and striker are pivoted to the release position where the mechanism is reset or armed but cannot actuate to strike the shutter button until a predetermined time delay has elapsed, as will be explained.

A pivotal pawl 102 acts as a stop element which normally holds the lever 90 in its release position and blocks pivoting of the lever in a direction allowing the striker 88 to actuate the shutter button 58b. The pawl 102 is an L-shaped member which is mounted to pivot about a vertical axis provided by a pin 104. One end of the pawl 102 is located near the striker end of lever 90, and the opposite end is adjacent to a core 106 of a solenoid 108. A spring 110 continuously urges the pawl 102 to pivot about the axis of pin 104 to the position shown in FIG. 4, wherein the pawl is located beneath the striker end of lever 90 to physically block the striker from moving downwardly. When the solenoid 108 is energized, its core 106 is retracted, and the core then pulls the adjacent end of the pawl 102 such that the pawl pivots against the force of spring 110 to withdraw the end of the pawl from a location beneath lever 90. Spring 96 then forces the lever to pivot striker 88 downwardly in a forceful manner to actuate the underlying shutter button 58b.

The solenoid 108 is controlled by a printed circuit board 112 having a conventional circuit that provides a time delay, after which the solenoid 108 is energized to retract its core 106. The time delay provided by the printed circuit board 112 is initiated by depression of a timer button 114 which is associated with the circuit board and which projects upwardly through the top panel 82 (see FIG. 5). The time delay provided by the circuit board 112 can be of any desired duration (such as 10 seconds, for example) and can be made adjustable if desired.

In use, the stand 12 is set up at the desired location in the manner shown in FIG. 1, and the camera housing is applied to the pedestal 20 by fitting the collar 44 onto the ball element 40. With the rear door 66 open, the camera 58 can be inserted through the back of the housing and butted up against the alignment surfaces 70 and 72. The pads 74, 76 and 78 can be inserted if necessary. The door 66 is then swung to the closed position and is held closed by the projecting lips 68.

The camera can be oriented and aimed as desired due to the ball and socket connection provided between the ball 40 and collar 44. The plunger 100 is depressed before the camera is inserted so that the lever 90 and striker 88 are held in the release position by the pawl 102. When it is desired to take a picture, the user manually depresses the timer button 114 and then moves into the area at which the camera is aimed. Depression of the timer button 114 initiates the time delay provided by the circuit board 112, allowing the user time to position himself or herself in front of the camera. After the time delay (10 seconds, for example) has elapsed, solenoid 108 is energized by the circuit board 112, and the core 106 is retracted to pull pawl 102 in a pivotal direction to release the pawl from beneath the lever 90. The spring 96 then pivots lever 90 in a direction to move the striker 88 downwardly in a forceful enough manner to actuate the shutter button 58b, thus taking a photograph.

The solenoid 108 is de-energized following a short delay after it has been energized. The core 106 is then extended by the solenoid. Thereafter, if the plunger 100 is depressed, lever 90 is pivoted to raise the striker 88, and the pawl 102 pivots under the influence of spring 110 to its blocking position beneath the end of the lever. The pawl then holds the lever in its armed or release position and waits until the next cycle of actuation is initiated by depression of the timer button 114.

Figure 7:
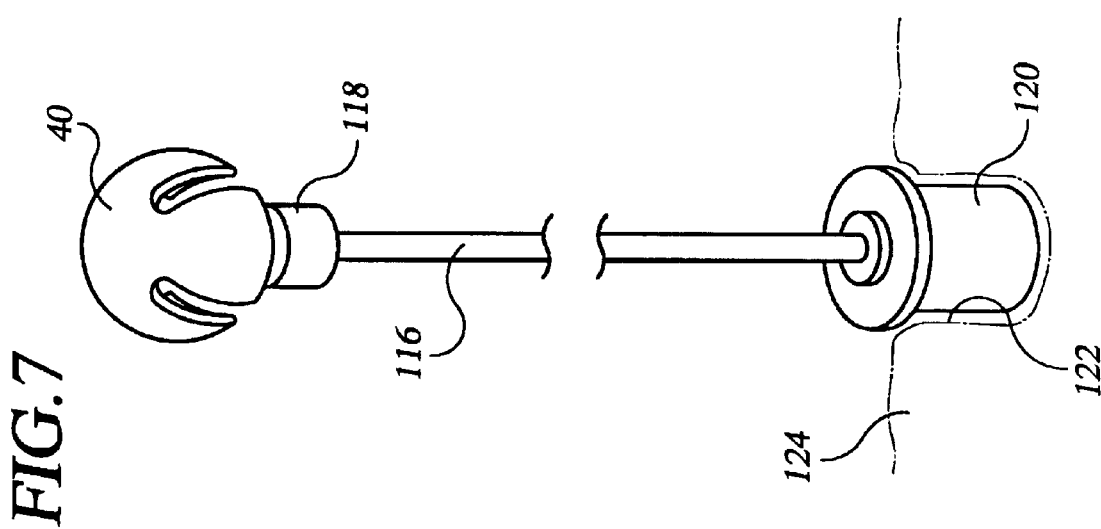
FIG. 7 is a perspective view of a modified camera stand which may be used with the camera housing shown in FIG. 1 in place of the tripod stand, with the break lines indicating continuous length.

FIG. 7 depicts an alternative stand which may be used for mounting of the camera housing 14 in place of the tripod stand 12. In the embodiment shown in FIG. 7, a rod or post 16 is provided on its top end with a fitting 118 that presents an opening (not shown) for receiving the pin 42 of the ball 40. The lower end of post 116 is provided with a fitting 120 having a size and shape to fit closely in a floor opening 122 formed in a deck 124 of a fishing boat. The post or stand of a swivel type fishing seat is normally located in the opening 122 and can be removed in order to accommodate the fitting 120.

The stand shown in FIG. 7 can be installed in the opening 122 to locate it at a desirable position in a fishing boat. The camera housing 14 can be mounted on the stand by applying the collar 44 to the ball 40 in the manner previously described in connection with the embodiment of the invention shown in FIGS. 1–6.

In some applications, it may be desirable to mount the post 116 on the tripod platform 20 to provide greater height for the camera. It is therefore within the scope of the invention to apply post 116 to opening 43 (FIG. 2), or to otherwise mount the post to the platform 20.

Figure 8:
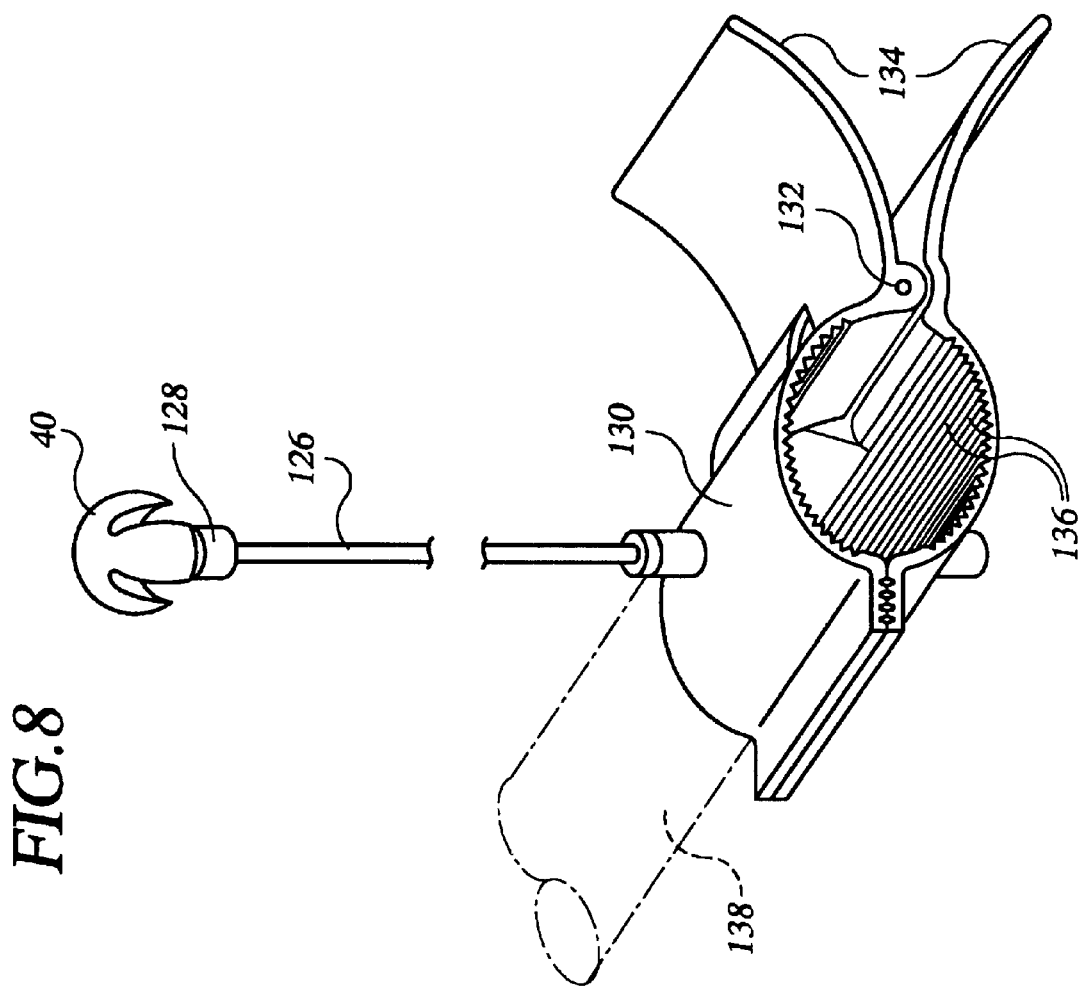
FIG. 8 is a perspective view of another alternative stand that may be used with the camera housing shown in FIG. 1 in place of the tripod stand, with the break lines indicating continuous length.

FIG. 8 depicts another alternative embodiment of a camera stand that can be used in place of the tripod stand 12. In the embodiment of FIG. 8, a rod or post 126 has on its upper end a fitting 128 providing an opening (not shown) for receiving the pin 42 of ball 40. The lower end of post 126 is provided with a clamp 130 having two halves that can be opened and closed relative to one another about a hinge axis 132. The clamp 130 can have finger grips 134 to facilitate opening of the clamp. The clamp is normally urged toward the closed position shown in FIG. 8 by a conventional spring. The interior surfaces of the clamp may be provided with serrations 136 in order to grip onto an object such as a rail 138 shown in FIG. 8.

Clamp 130 is constructed in a manner allowing it to be clamped securely onto a wide variety of objects so that the stand can be mounted at different locations that may be desirable for the particular application of the device. The camera housing 14 can be attached by applying the collar 44 to the ball 40 in the manner previously described.

In some applications, it may be desirable to mount the camera housing directly to the clamp 130 rather than using the post 126. It is therefore within the scope of the invention to mount ball 40 directly to clamp 130, or to otherwise mount the camera housing to clamp 130 without using the post 126.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. Apparatus for actuating a single use camera having an actuator button, said apparatus comprising:
    a camera support adapted to receive and hold the camera, said camera support comprising a camera housing having an open interior for receiving the camera, and a stand on which said camera housing is supported;
    a striker element on said support having an actuated condition wherein said striker element operates the actuator button said striker element and control mechanism being mounted on said housing above said interior; and
    a control mechanism for said striker element operable to effect the actuated condition thereof following elapse of a predetermined time delay;
    wherein said housing has a front alignment surface against which the camera abuts and a side alignment surface against which the camera abuts, and including a spacer pad fitted closely between the camera and a surface of the camera housing opposite said side alignment surface to align the actuator button of the camera below said striker element.

2. Apparatus as set forth in claim 1, wherein:
    said stand includes a ball element; and
    said housing includes a socket in which said ball element is received to allow directional adjustment of the housing on the stand.

3. Apparatus as set forth in claim 1, wherein said housing includes:
    a platform located above said interior on which said striker element and control mechanism are mounted, said striker element extending through said platform for actuation against the actuator button; and
    a front opening through which a lens of the camera sights.

4. Apparatus as set forth in claim 3, wherein said housing includes:
    a rear opening for loading of the camera into said interior; and
    a door for opening and closing said rear opening.

5. Apparatus as set forth in claim 1, wherein said stand comprises:
    a camera mounting element on which said camera housing is mounted;
    at least three legs arranged in a tripod configuration each connected with said mounting element for movement about a generally horizontal pivot axis; and
    an adjustment element on said mounting element adjustable thereon in a manner to adjust the pivotal position of each leg about its axis to thereby adjust the angle of inclination of each leg.

6. Apparatus as set forth in claim 5, including:
    a ball element on said mounting element; and
    a socket on said camera housing which receives said ball element in a manner to allow adjustment of said housing to adjust the direction in which the camera faces.

7. Apparatus as set forth in claim 5, wherein:
    said camera mounting element comprises a pedestal having a threaded side wall presenting at least three slots receiving the respective legs; and
    said adjustment element comprises a threaded ring received on said side wall and adjustable up and down thereon in threaded fashion to engage the legs extending through said slots in a manner to decrease the angle of inclination of each leg as said ring is threaded upwardly and increase the angle of inclination of each leg as said ring is threaded downwardly.

8. Apparatus as set forth in claim 1, wherein said stand comprises:
    a post having top and bottom ends, said top end receiving and supporting said camera housing; and
    a fitting on said bottom end of the post adapted to be closely received in an opening in a boat deck that normally receives a fishing seat support leg.

9. Apparatus as set forth in claim 1, wherein said stand comprises:
    a post having top and bottom ends, said top end receiving and supporting said camera housing; and
    a clamp connected with said bottom end of the post constructed to be clamped onto a support member.

10. Apparatus as set forth in claim 1, wherein said striker element is mounted on said support for generally up and down movement between an actuating position wherein said element is lowered against the actuator button in said actuated condition and a release position wherein said element is raised above and away from the actuator button.

11. Apparatus as set forth in claim 10, wherein said control mechanism includes:
- a pivot lever mounted on said support for pivotal movement in one direction to lower said element to the actuating position and in an opposite direction to raise said element to the release position, said lever being urged to pivot in said one direction; and
- a stop element blocking movement of said lever in said one direction until elapse of said time delay, whereupon said stop element allows said lever to pivot in said one direction.

12. Apparatus as set forth in claim 11, wherein said stop element comprises a pivotal pawl and said control mechanism includes a control element for said pawl acting to pivot the pawl away from said lever after elapse of said time delay.

13. Apparatus as set forth in claim 11 including a manually operable plunger for moving said lever in said opposite direction whereby movement of said lever in said one direction is blocked by said stop element.

14. Apparatus as set forth in claim 13, including a manually operable timer element for initiating said time delay.

15. Apparatus for actuating a single use camera having an actuator button, said apparatus comprising:
- a stand;
- a camera housing mounted on said stand and having an open interior for receiving and holding the camera with the camera facing in a selected direction;
- a striker mechanism on said housing movable between an actuating position wherein a portion of said striker mechanism strikes the actuator button to operate the camera and a release position wherein said portion is displaced from the actuator button, said striker mechanism including a lever mounted on said housing for pivotal movement about a fulcrum and having one end section which is located on one side of said fulcrum and which carries said portion of the striker mechanism; and
- a control mechanism on said housing for controlling said striker mechanism, said control mechanism having a time delay of a selected duration after which said striker mechanism moves from the release position to the actuating position and said control mechanism acting directly on said one end section.

16. Apparatus as set forth in claim 15, wherein said housing includes:
- a front opening through which the camera may view, said front opening having a size and shape to prevent passage of the camera therethrough;
- a rear opening through which the camera may be inserted into and removed from the interior of the housing;
- a door for opening and closing said rear opening; and
- a plurality of alignment surfaces against which the camera may be positioned to situate the actuator button of the camera beneath said striker element.

17. Apparatus as set forth in claim 16, wherein said housing comprises a compartment above said open interior containing said striker element and control mechanism.

18. Apparatus for actuating a single use camera having an actuator button, said apparatus comprising:
- a camera support adapted to receive and hold the camera;
- striker element on said support having an actuated condition wherein said striker operates the actuator button, wherein said striker element is mounted on said support for generally up and down movement between an actuating position wherein said element is lowered against the actuator button in said actuated condition and a release position wherein said element is raised above and away from the actuator button; and
- a control mechanism for said striker element operable to effect the actuated condition thereof following elapse of a predetermined time delay, said control mechanism including a pivot lever mounted on said support for pivotal movement in one direction to lower said element to the actuating position and in an opposite direction to raise said element to the release position, said lever being urged to pivot in said one direction, and a stop element blocking movement of said lever in said one direction until elapse of said time delay, whereupon said stop element allows said lever to pivot in said one direction, wherein said stop element comprises a pivotal pawl and said control mechanism includes a control element for said pawl acting to pivot the pawl away from said lever after elapse of said time delay.

19. Apparatus for actuating a single use camera having an actuator button, said apparatus comprising:
- a camera support adapted to receive and hold the camera;
- a striker mechanism on said support having an actuated condition wherein said striker mechanism operates the actuator button, said striker mechanism including a lever mounted on said camera support for pivotal movement about a fulcrum and having one end portion which is located on one side of said fulcrum and which operates the actuator button; and
- a control mechanism for said striker element operable to effect the actuated condition thereof following elapse of a predetermined time delay, said control mechanism acting directly on said one end portion of said lever.

* * * * *